No. 12,605. REISSUED FEB. 12, 1907.
J. E. GRAHAM.
RAILWAY FROG.
APPLICATION FILED JUNE 25, 1906.
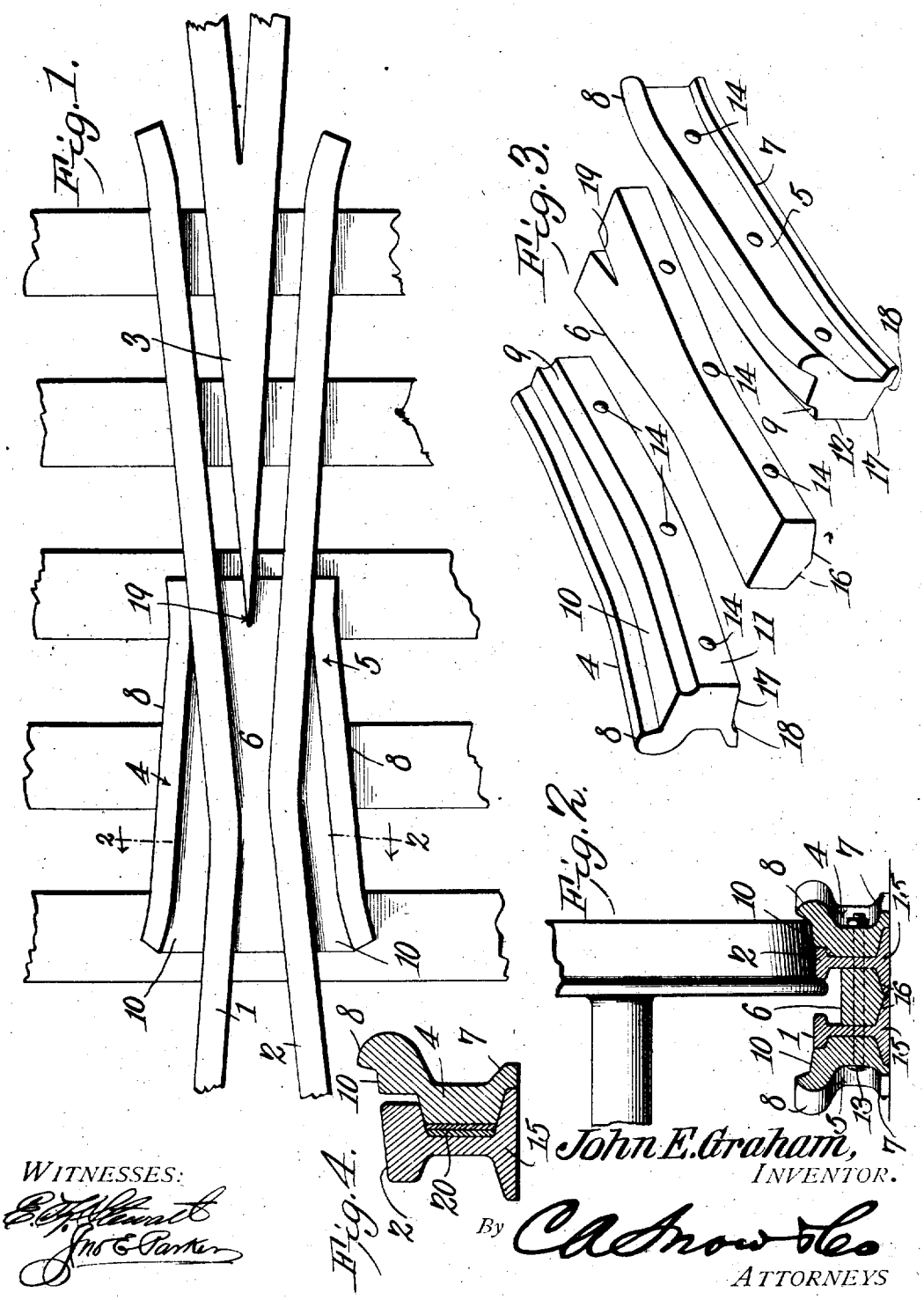
WITNESSES:
E. F. Ellwood
Jno E. Parker
John E. Graham,
INVENTOR.
By C. A. Snow & Co.
ATTORNEYS

UNITED STATES PATENT OFFICE.

JOHN E. GRAHAM, OF SALEM, VIRGINIA, ASSIGNOR TO THE GRAHAM FLANGE FROG COMPANY, INC., OF SALEM, VIRGINIA, A CORPORATION OF VIRGINIA.

RAILWAY-FROG.

No. 12,605. Specification of Reissued Letters Patent. Reissued Feb. 12, 1907.

Original No. 790,629, dated May 23, 1905. Application for reissue filed June 25, 1906. Serial No. 323,395.

*To all whom it may concern:*

Be it known that I, JOHN E. GRAHAM, a citizen of the United States, residing at Salem, in the county of Roanoke and State of Virginia, have invented a new and useful Railway-Frog, of which the following is a specification.

This invention relates to railway-frogs.

The objects of the invention are to simplify the construction and increase the efficiency of such devices, to dispense with the employment of guard-rails opposite the frog-point, to prevent springing or displacement of the frog-rails which ordinarily results from the side thrust and pressure of the engine and car wheels, to retain the frog-rails within the frog even in case of breakage of the former, to reduce the side thrust of the wheels against the frog-flanges, to prevent the wheel-flange from striking the frog-point, to compensate for any wear of the frog-flanges which would reduce the efficiency of the device, to preclude any deflection of the frog-point relatively to the frog, and, finally, generally to improve and strengthen devices of this character.

With the above and other objects in view, as will appear as the nature of the invention is better understood, the same consists in the novel construction and combination of parts of a railway-frog, as will be hereinafter fully described and claimed.

In the accompanying drawings, forming a part of this specification, and in which the characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in plan, exhibiting a frog constructed in accordance with the present invention. Fig. 2 is a view in elevation, partly in section, showing the coöperative relation between the frog-rails, frog, and a car-wheel when the latter is traveling over the parts. Fig. 3 is a perspective detail view of the frog with its parts separated. Fig. 4 is a sectional detail view of a slightly-modified form of the invention.

Referring to the drawings, 1 and 2 designate a pair of frog-rails, and 3 a frog-point. These parts may be of the usual or any preferred construction, and therefore need no detailed description.

The present invention resides in the novel construction of the frog proper, the same being shown in detail in Fig. 3 and comprising two frog-blocks 4 and 5 and a spacing-block 6. Each of the frog-blocks is a counterpart of the other, and a description of one will therefore serve for both. The block may be either rolled or cast, as may be preferred, and is provided on its lower outer side with a base-flange 7, at its upper outer side with a wheel-flange 8, on its inner side with a rail-tread seat 9, and adjacent to the wheel-flange with a wheel-rim tread 10. The block is formed on proper lines and curves to cause the wheels to be switched from one track to another in the usual manner and generally conforms to the lines of an ordinary frog. When the two frog-blocks are assembled, as shown in Fig. 1, the wheel-flanges converge toward each other in the direction of the frog-point, thereby causing the entering end of the frog to present an inclined or wedge face to the side of the car or engine wheels, which will operate to shift the same gradually and smoothly onto the frog-point, the entering ends of the wheel-flanges being slightly curved away from the frog-rails, thus to prevent any impact between the sides of the wheels and the flanges on the initial entry of the former into the frog. Of course it will be understood that the opposed faces of the two frog-blocks are oppositely curved, thus to secure the proper shifting of the car-wheels from one of the frog-rails to the other on either side.

The spacing-block 6 is preferably shaped to conform accurately to the opposed faces 11 and 12 of the frog-blocks, and the three parts are held combined by bolts 13, in this instance three in number, which pass through the body portions of the frog-blocks and of the spacing-block, suitable bolt-openings 14 being provided for this purpose.

As shown in Fig. 2, the under side of the frog members closely impinge and inclose the bases 15 of the frog-rails, and to secure this result the under face of the spacing-block is angularly or reversely inclined, as shown at 16, to fit against the upper sides of the inner portions of the bases, while the under face of each of the frog-blocks is upwardly inclined, as at 17, to bear upon the upper faces of the outer portions of the bases. In providing the inclined portions 17 there is formed a longitudinal shoulder 18 on the outer side of each of the blocks, and these shoulders bear against the outer edges of the bases and operate positively to clamp them together and to hold them from movement, while the spacing-block also coöperates to prevent any inward movement of the frog-rails relatively to each other.

In order to prevent any lateral shifting of the frog-point 3, one end of the spacing-block is provided with a triangular vertically-disposed groove or recess 19, in which the terminal of the frog-point rests, as clearly shown in Fig. 1.

As shown in Figs. 1 and 2, the wheel-rim treads incline slightly toward the center of the frog, while the upper faces of the frog-rail treads are horizontal; but, as shown in Fig. 4, both the wheel-rim treads and the upper faces of the frog-rails may be inclined, thus to conform accurately to the periphery or tread of the car-wheels.

To increase the life of the frog and to compensate for wear of the flanges 8, liners or fillers 20 may be employed, which will be disposed between the inner faces of the frog-blocks and the webs of the frog-rails, as shown in Fig. 4, and as the wheel-flanges wear a liner may be removed and the blocks again positioned, and by thus compensating for wear all danger of the frog-point being struck by the wheel-flange is obviated. This feature will be found of importance, inasmuch as by the provision of the liners the removal of a frog-block when its flange becomes worn is rendered unnecessary, thereby effecting large saving to railway companies.

It will be seen from the foregoing description that by the provision of the wheel-flanges 8 on the frog-blocks the employment of the ordinary guard-rails is rendered unnecessary and that these wheel-flanges, or rather guard-flanges, will operate positively to cause the car-wheels to be shifted from one of the frog-rails to the other. By reason of the rail-tread seats 9 a solid bearing is provided for the under faces of the frog-rail treads, and, further, these are caused to present, in combination with the wheel-rim treads 10, a practically flat surface over which the wheels will travel. Owing to the manner in which all the parts are constructed and combined there will be no possibility of a frog-rail becoming separated from the frog proper nor for the same to take place with the frog-point so long as the bolts 13, which pass through the frog-blocks, frog-rails, and spacing-blocks, remain in position.

By constructing the frog-blocks and spacing-block in the manner described these parts may be combined with rails in common use without requiring any change in their structural arrangement, thereby adapting the device for ready adoption when desired.

I claim—

1. A railway-frog having means to support the tread of the wheel throughout the entire distance and to engage the rim of the wheel-tread to guide and confine it to position, substantially as described.

2. As a new article of manufacture, a frog-block having one face shaped to conform to a frog-rail and having a wheel-flange disposed obliquely to the face.

3. As a new article of manufacture, a frog-block having one of its faces shaped to conform to a frog-rail, and a wheel-rim tread integral with the block and disposed obliquely to the face.

4. As a new article of manufacture, a frog-block embodying in an integral structure, a wheel-flange, a transversely-beveled wheel-rim tread and a rail-tread seat.

5. As a new article of manufacture, a frog-block provided with a wheel-flange, the terminals of which are curved, and with a wheel-rim tread, the upper face of the latter being inclined away from the wheel-flange.

6. A railway-frog embodying frog-rails, and a frog-point, in combination with a frog embodying members to embrace the frog-rails and to engage the terminal of the frog-point, and removable spacers or liners interposed between the opposed faces of the outer members of the frog and the web of the frog-rails.

7. A railway-frog embodying frog-rails having the upper faces of their treads inclined, in combination with frog-blocks provided with wheel-flanges and with wheel-rim treads, the upper faces of which are inclined to coincide with those of the treads of the frog-rails.

8. A railway-frog comprising frog-rails and a frog-point, and flanged frog-blocks to embrace the outer sides of the frog-rails and a spacing-block to engage the terminal of the frog-point.

9. A railway-frog embodying frog-rails and a frog-point, and a frog comprising frog-blocks to engage the external portions of the frog-rails, each block being provided with a guard-flange, and a spacing-block interposed between the frog-rails and having a seat to receive the terminal of the frog-point.

10. A railway-frog comprising frog-rails and a frog-point, and a frog comprising frog-blocks having their upper portions each provided with a guard-flange and their opposed faces shaped to conform to the contour of the rail-base, tread and web, and a spacing-block disposed between the rails and shaped to conform to the faces of the webs and the upper sides of the rail-bases, and provided with means for engaging the frog-point, and bolts passing through the frog-blocks, spacing-blocks and rails.

11. A railway-frog comprising frog-rails and a frog-point, and a frog comprising a spacing-block disposed between the rails and provided with a seat to receive the terminal of the frog-point, and a pair of frog-blocks disposed externally of the rails and provided on their outer upper edges with a guard-flange, the inner faces of the block being each provided with a rail-tread seat, and on its upper and lower portions with a wheel-rim tread, and bolts passing through all the parts for holding them combined.

12. As a new article of manufacture, a railway-frog comprising a pair of frog-blocks, each provided on its upper outer edge with a guard-flange, and the opposed faces of the blocks being shaped to the contour of the external portions of the frog-rails, and a spacing-block shaped to conform to the internal portions of the base and web of the frog-rails, and having at one end a seat to receive the terminal of the frog-point.

In testimony that I claim the foregoing as my own I have hereto affixed my signature in the presence of two witnesses.

JOHN E. GRAHAM.

Witnesses:
W. H. RUTHNOTT,
R. D. HURT.